(12) United States Patent
Fan et al.

(10) Patent No.: US 9,638,838 B1
(45) Date of Patent: May 2, 2017

(54) LENS HAVING MICROSTRUCTURES

(71) Applicant: Newmax Technology Co., Ltd., Taichung (TW)

(72) Inventors: Kuo-Fu Fan, Taichung (TW); Ho-Ming Chang, Taichung (TW); Tsung-Chi Tsai, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 14/963,815

(22) Filed: Dec. 9, 2015

(51) Int. Cl.
*G02B 3/08* (2006.01)
*G02B 13/00* (2006.01)
*G02B 27/00* (2006.01)
*G02B 3/00* (2006.01)

(52) U.S. Cl.
CPC .......... *G02B 3/08* (2013.01); *G02B 13/0055* (2013.01); *G02B 27/0018* (2013.01); *G02B 2003/0093* (2013.01)

(58) Field of Classification Search
CPC ........................................................ G02B 3/08
USPC ........................................................ 359/742
See application file for complete search history.

(56) References Cited

U.S. PATENT DOCUMENTS 5,260,828 A * 11/1993 Londono ............. G02B 5/1876
359/565

* cited by examiner

*Primary Examiner* — James Jones
(74) *Attorney, Agent, or Firm* — Muncy, Geissler, Olds & Lowe, P.C.

(57) ABSTRACT

A lens having microstructures has a first face and a second face. The first face has an optical portion at a central portion thereof. An optical mechanism portion is defined around the optical portion. The optical mechanism portion is formed with at least one recessed microstructure whose bottom has a matte surface.

7 Claims, 18 Drawing Sheets

LENS HAVING MICROSTRUCTURES

BACKGROUND OF THE INVENTION

Field of the Invention

The present invention relates to optical lens.

Description of the Prior Art

Conventionally, to diminish stray light in tiny lens set, such as that of smartphone's camera, the lens is designed to have a high curvature. However, the lens having high curvature gives a bad performance of imaging.

SUMMARY OF THE INVENTION

The main object of the present invention is to provide a lens having microstructures to diminish or prevent stray light.

To achieve the above and other objects, a lens having microstructures of the present invention has a first face and a second face. At least the first face has an optical portion at a central portion thereof. An optical mechanism portion surrounds the optical portion. At least a part of an area of the optical mechanism portion is formed with at least one recessed microstructure. A bottom of the at least one microstructure has a matte surface.

To achieve the above and other objects, another lens is also provided. The lens has a first face and a second face. At least the first face has an optical portion at a central portion thereof. An optical mechanism portion surrounds the optical portion. At least a part of the optical mechanism portion is formed with plural protruded microstructures which are pyramid-shaped. The microstructures have matte surfaces.

Thereby, the microstructures of the lens can function to disperse or diminish stray light to maintain the performance of imaging.

The present invention will become more obvious from the following description, when taken in connection with the accompanying drawings, which show, for purpose of illustrations only, the preferred embodiment(s) in accordance with the present invention.

BRIEF DESCRIPTION OF THE DRAWINGS

FIG. 2A is a profile of the present invention;

DETAILED DESCRIPTION OF THE PREFERRED EMBODIMENTS

Please refer to FIG. 1 to FIG. 10, the lens 11, 11a, 11b, 11c, 11d, 11e, 11f of the present invention, such as an optical lens used in a lens set 10, has a first face and a second face. At least the first face has an optical portion 111 at a central portion thereof. An optical mechanism portion surrounds the optical portion 111. At least a part of an area of the optical mechanism portion is formed with at least one recessed microstructure 112, 112a, 112b, 112c, 112d, 112e, 112f. A bottom of the at least one microstructure 112, 112a, 112b, 112c, 112d, 112e, 112f has a matte surface. For example, the microstructure 112, 112a, 112b, 112c, 112d, 112e can be formed by laser carving to disperse the stray light.

Figure 1:
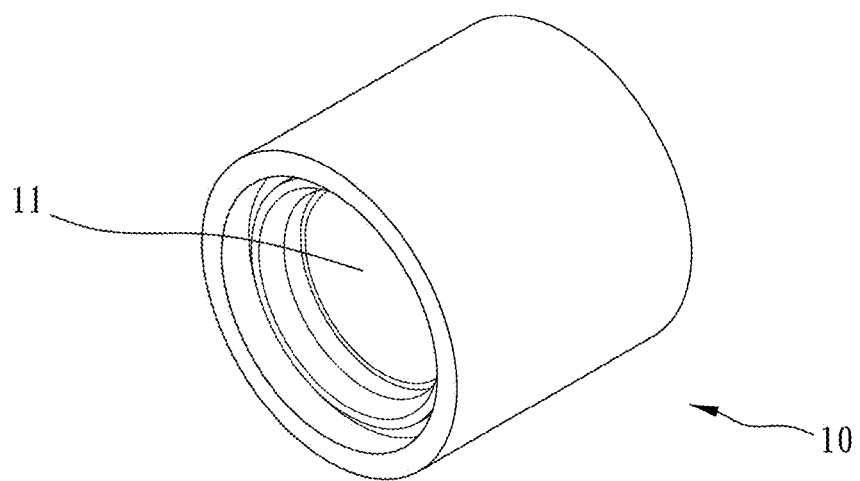
FIG. 1 is a stereogram of the present invention.
Figure 2:
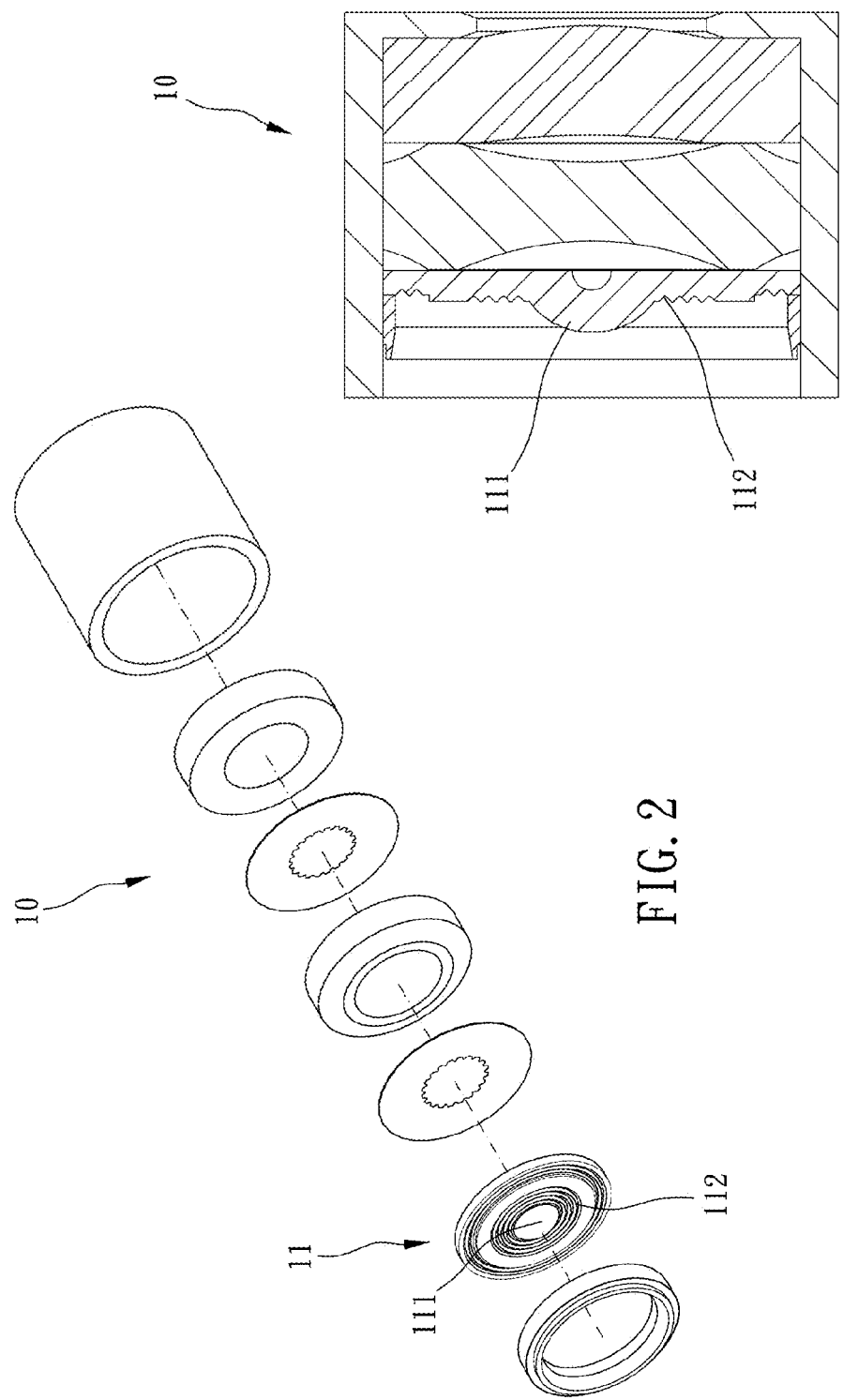
FIG. 2 is a breakdown drawing of the present invention.
Figure 3:
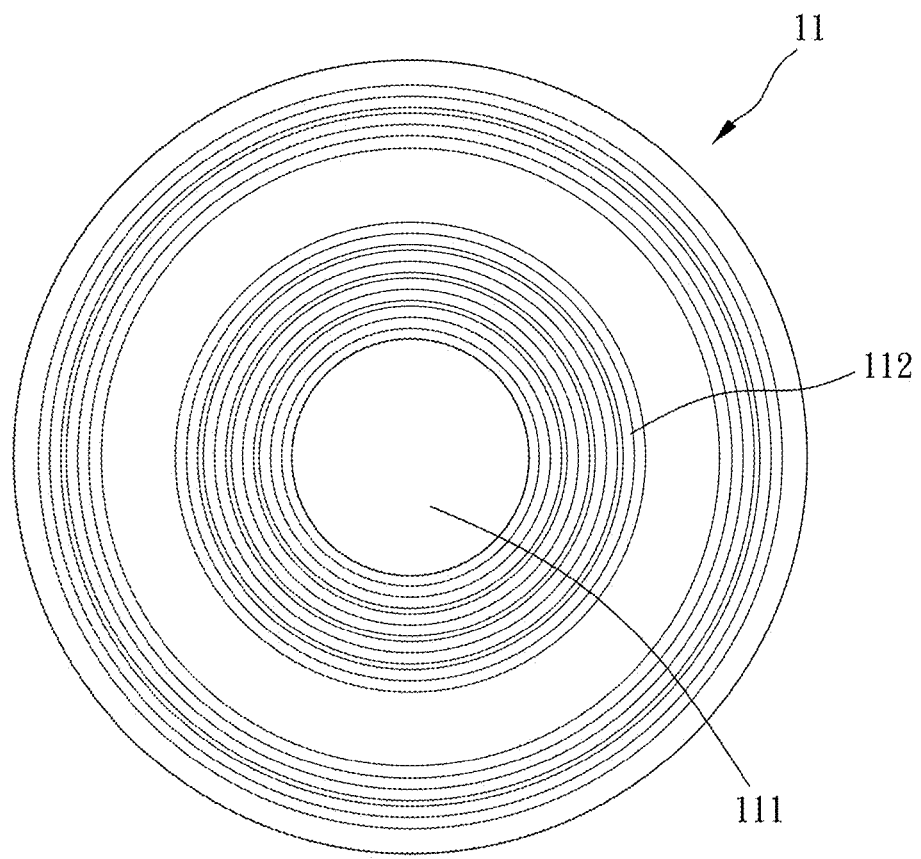
FIG. 3 is a front view showing a first embodiment of the present invention.
Figure 3A:
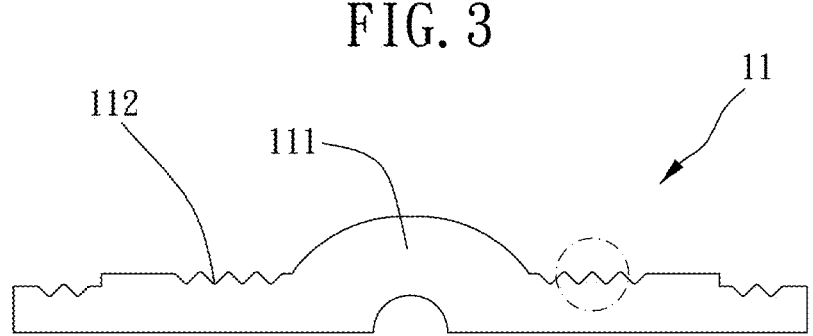
FIG. 3A is a profile showing a first embodiment of the present invention.
Figure 4:
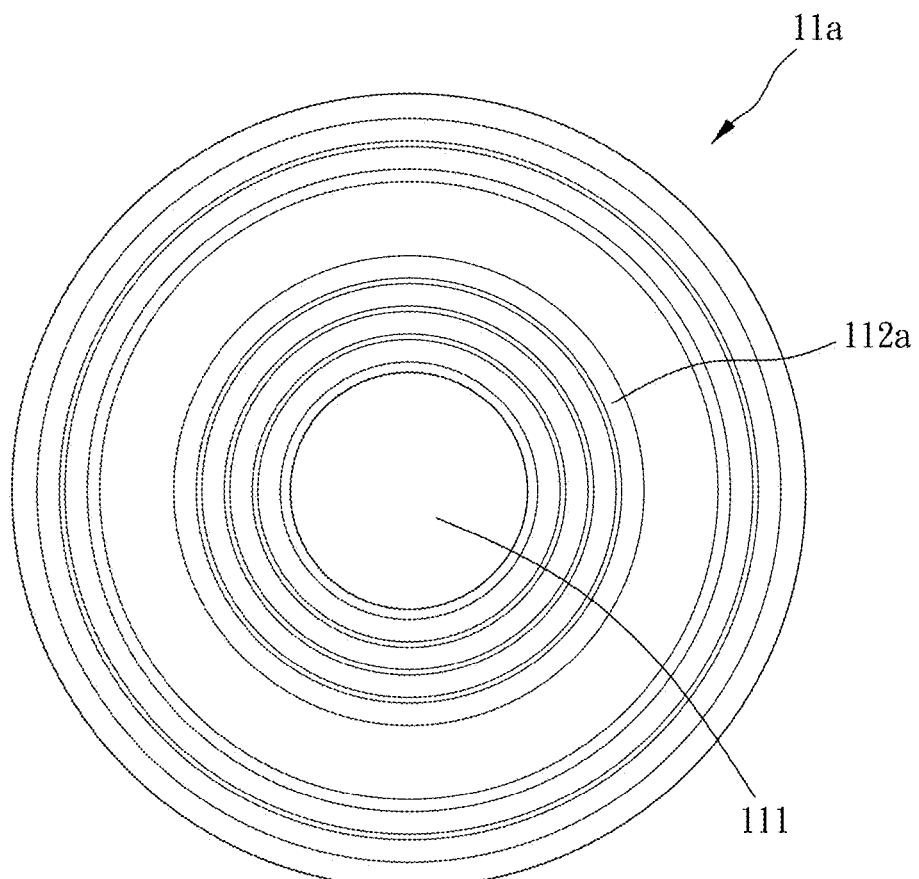
FIG. 4 is a front view showing a second embodiment of the present invention.
Figure 4A:
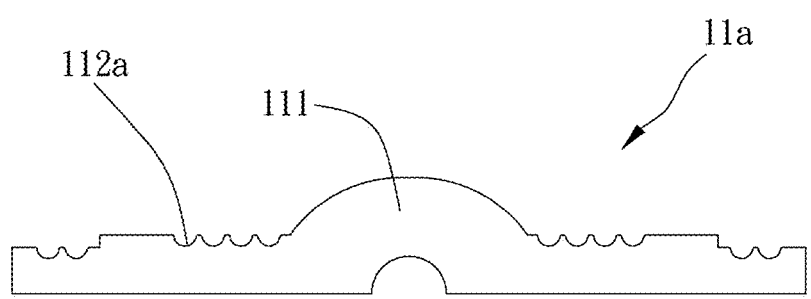
FIG. 4A is a profile showing a second embodiment of the present invention.
Figure 5:
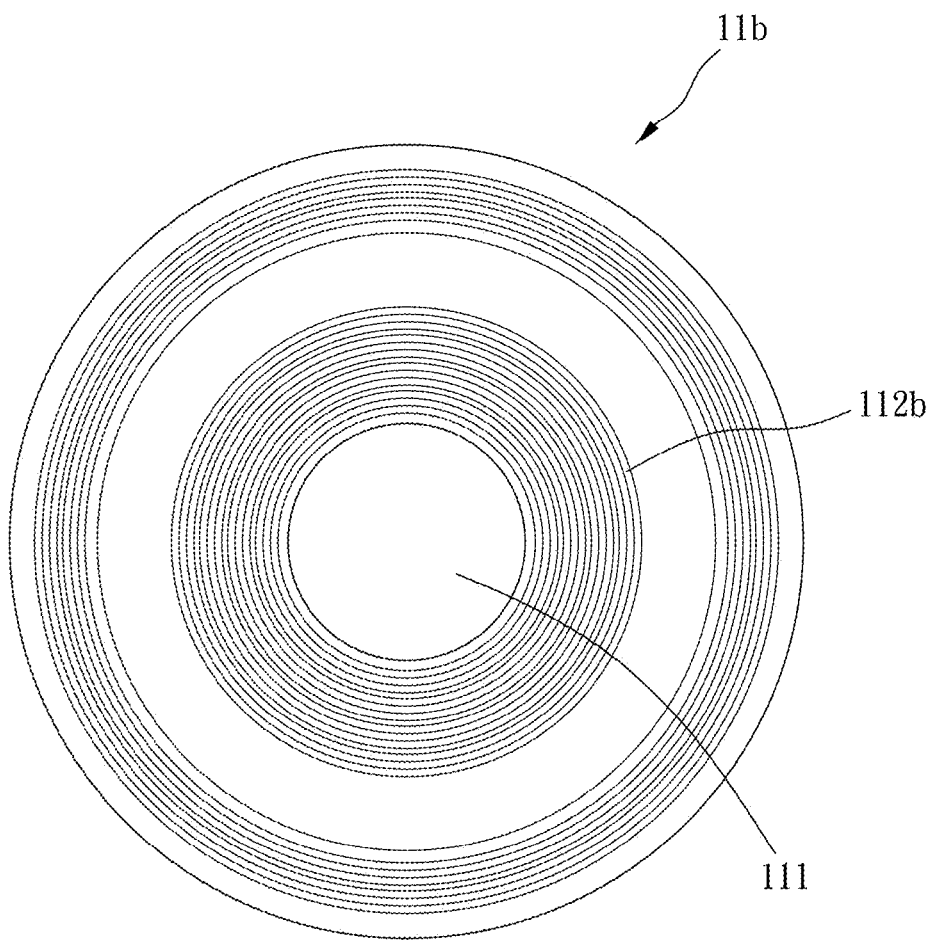
FIG. 5 is a front view showing a third embodiment of the present invention.
Figure 5A:
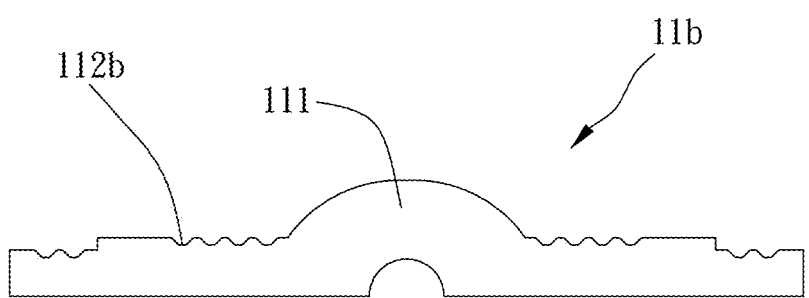
FIG. 5A is a profile showing a third embodiment of the present invention.
Figure 6:
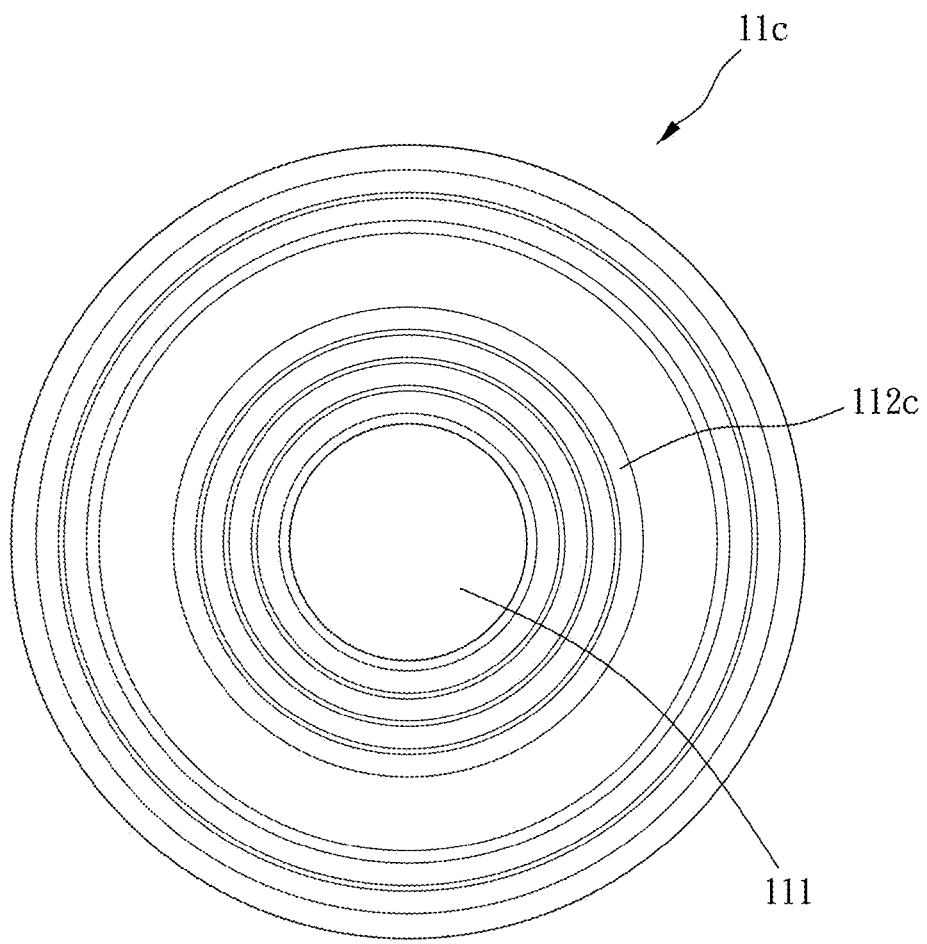
FIG. 6 is a front view showing a fourth embodiment of the present invention.
Figure 6A:
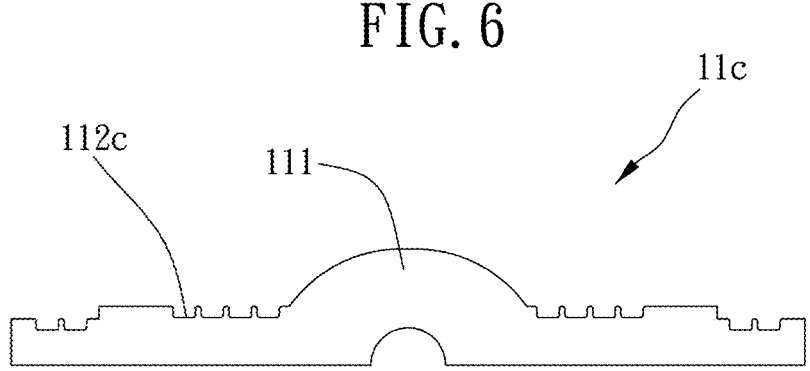
FIG. 6A is a profile showing a fourth embodiment of the present invention.
Figure 24:
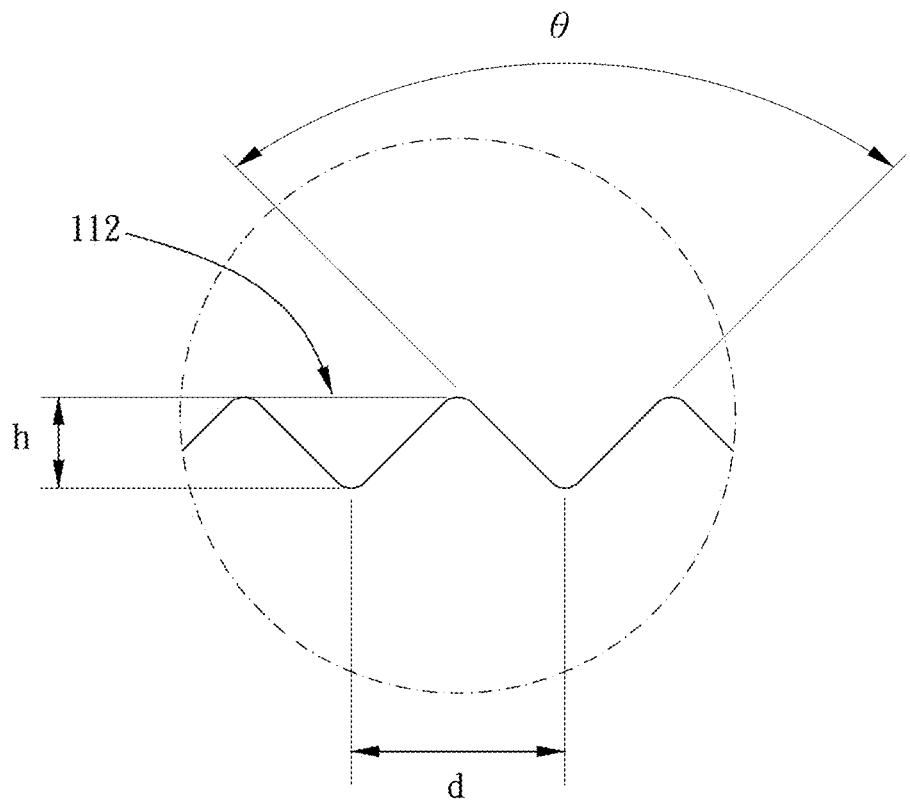
FIG. 24 is an illustrations ing the specification of microstructures of the present invention.

About the microstructure, in some embodiments, the lens 11, 11a, 11b, 11c defines a central axis penetrating the center of the lens 11, 11a, 11b, 11c. Plural microstructures 112, 112a, 112b, 112c are annular grooves extending around the central axis and arranged concentrically in interval. About the annular grooves, each annular groove can have a cross-section which is V-shaped, as shown in FIGS. 3 and 3A. The cross-section of the bottom of each annular groove can be semi-circular, as shown in FIGS. 4 and 4A. Alternatively, the cross-section of each annular groove can be quadrangle (square, rectangle, or trapezoid, etc.), as shown in FIGS. 5, 5A, 6, and 6A. Preferably, as shown in FIG. 24, each annular groove has a lowest bottom portion. An uppermost top portion is defined between any two adjacent annular grooves. A distance d between any two adjacent bottom portions is 0.024 mm to 0.05 mm. A distance h along a direction of the central axis between any one top portion and the bottom portion adjacent thereto is 8 micrometers to 12 micrometers. An angle θ defined by any one bottom portion and the two top portions adjacent thereto is 60 degrees to 80 degrees.

Figure 7:
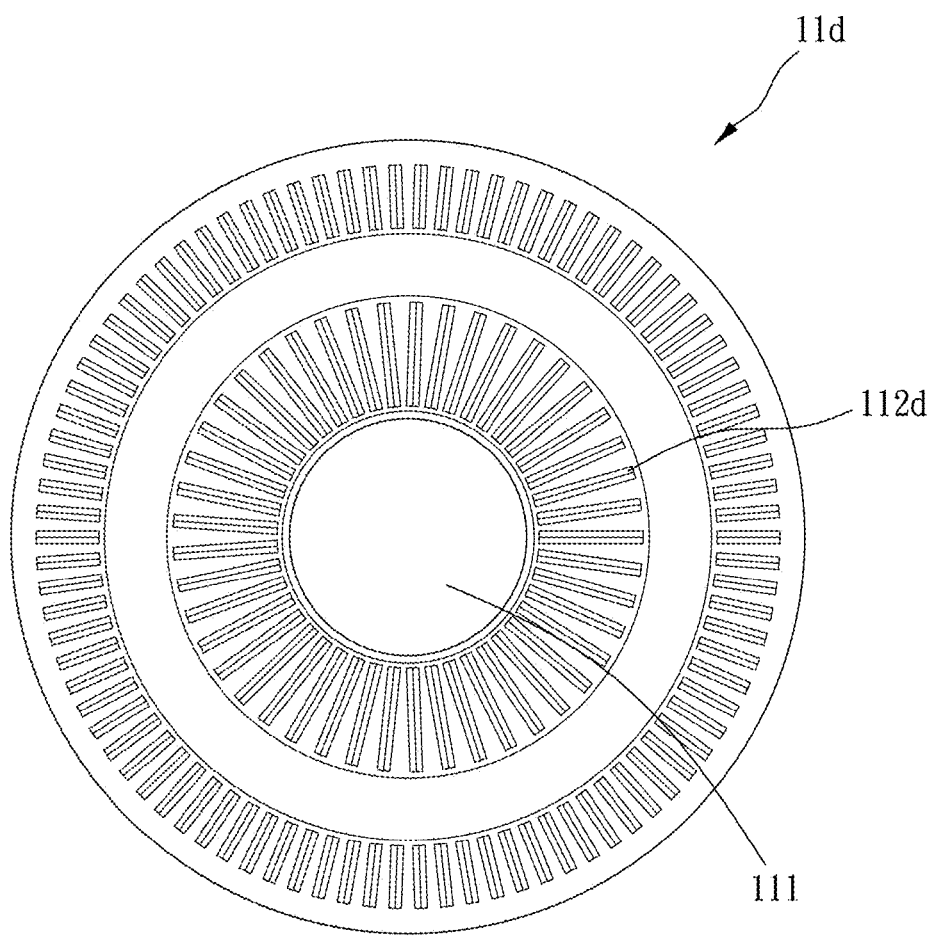
FIG. 7 is a front view showing a fifth embodiment of the present invention.
Figure 8:
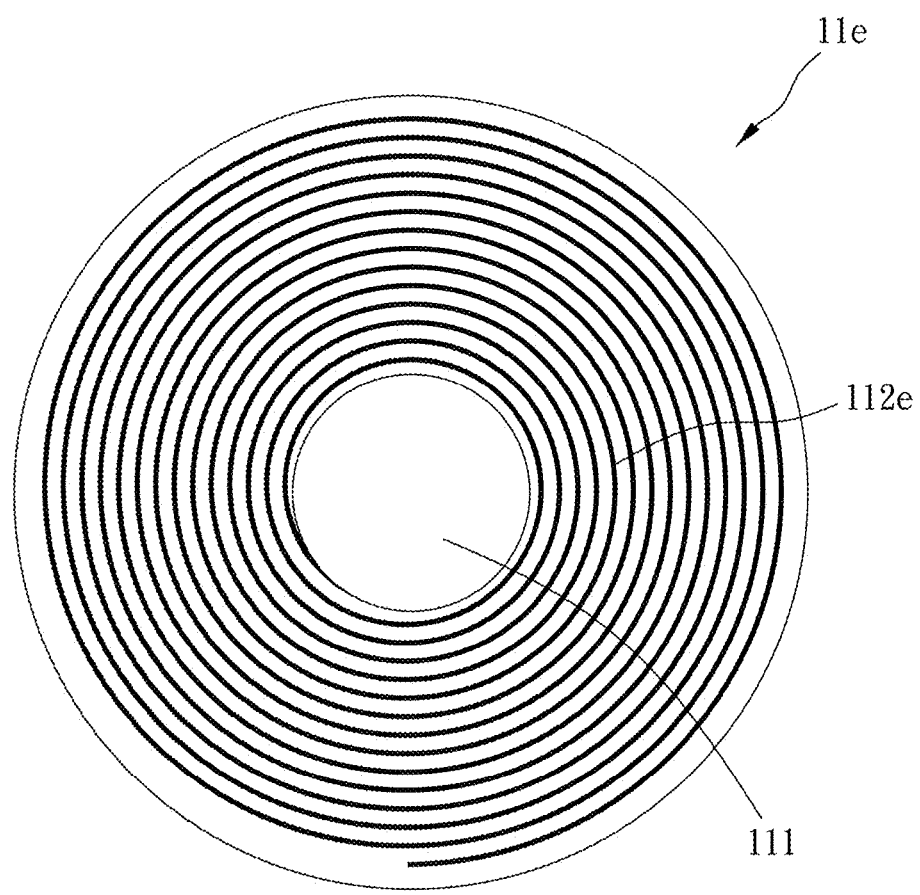
FIG. 8 is a front view showing a sixth embodiment of the present invention.

FIG. 7 shows another embodiment. The microstructures 112*d* are grooves extending radially and arranged in interval around the central axis. In another embodiment shown in FIG. 8, the microstructure 112*e* is a spiral groove extending around the central axis.

Figure 9:
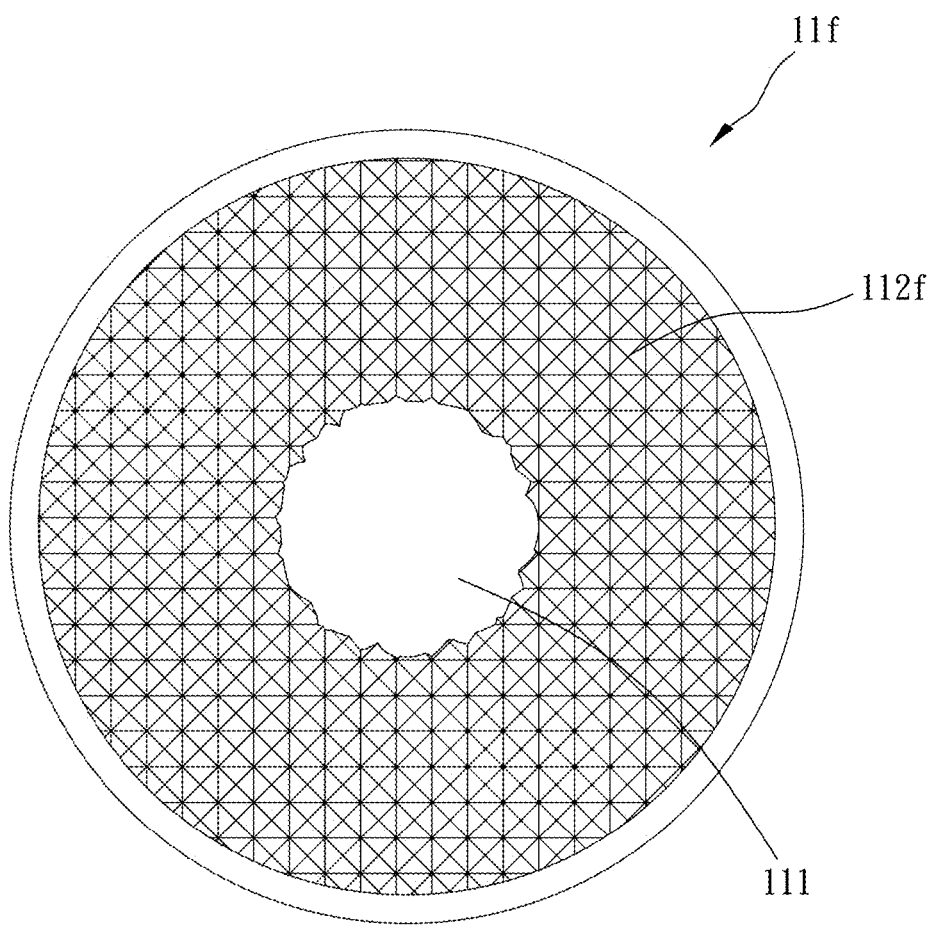
FIG. 9 is a front view showing a seventh embodiment of the present invention.
Figure 10:
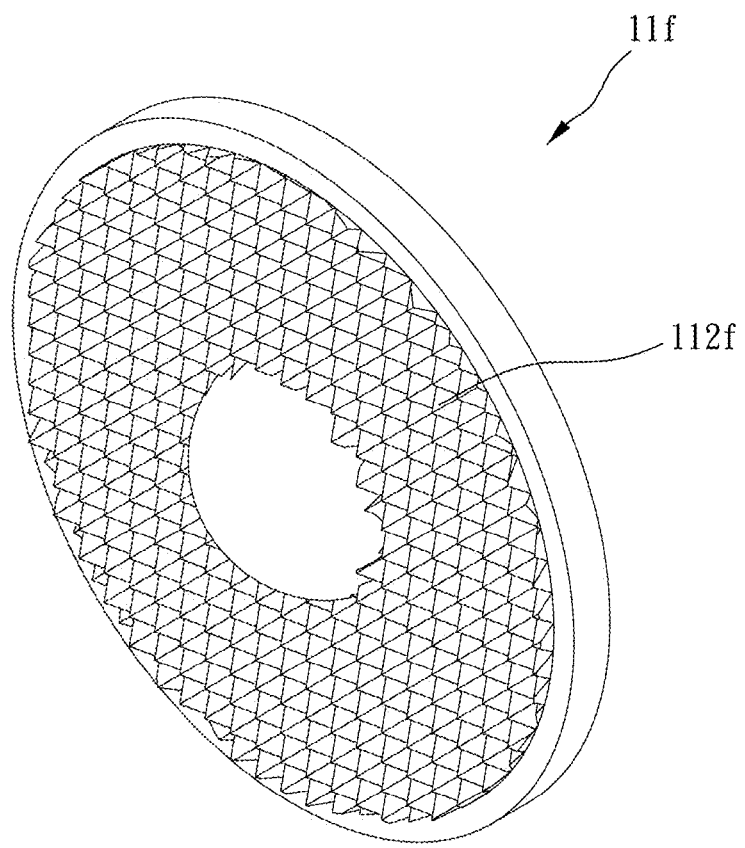
FIG. 10 is a stereogram showing a seventh embodiment of the present invention.

Besides, as shown in FIGS. 9 and 10, the microstructures 112*f* can be plural protruded pyramids having matte surfaces.

Figure 11:
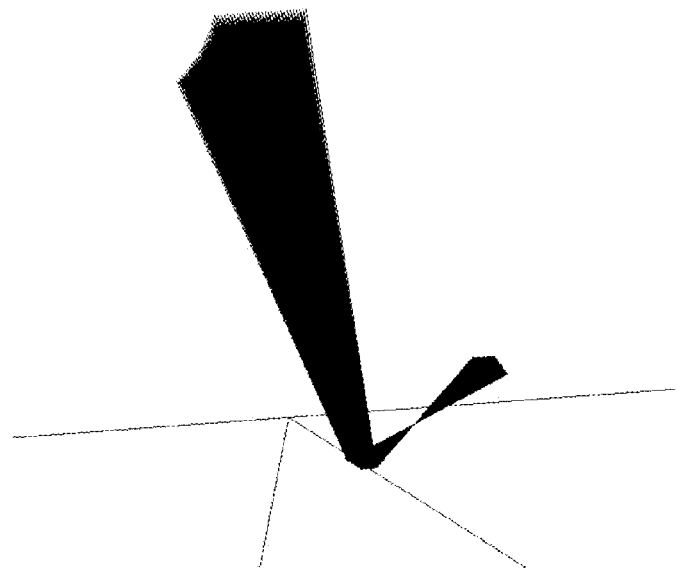
FIG. 11 is a lateral view of light path of the lens before processing.
Figure 12:
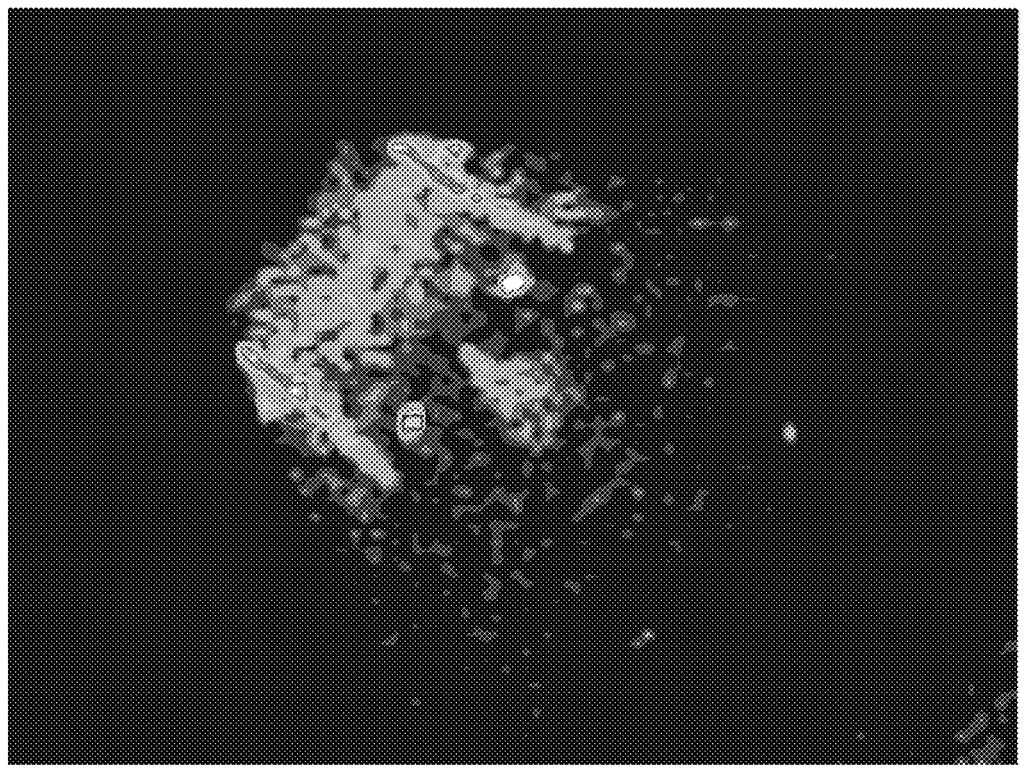
FIG. 12 is a real photo of light path of the lens before processing.
Figure 13:
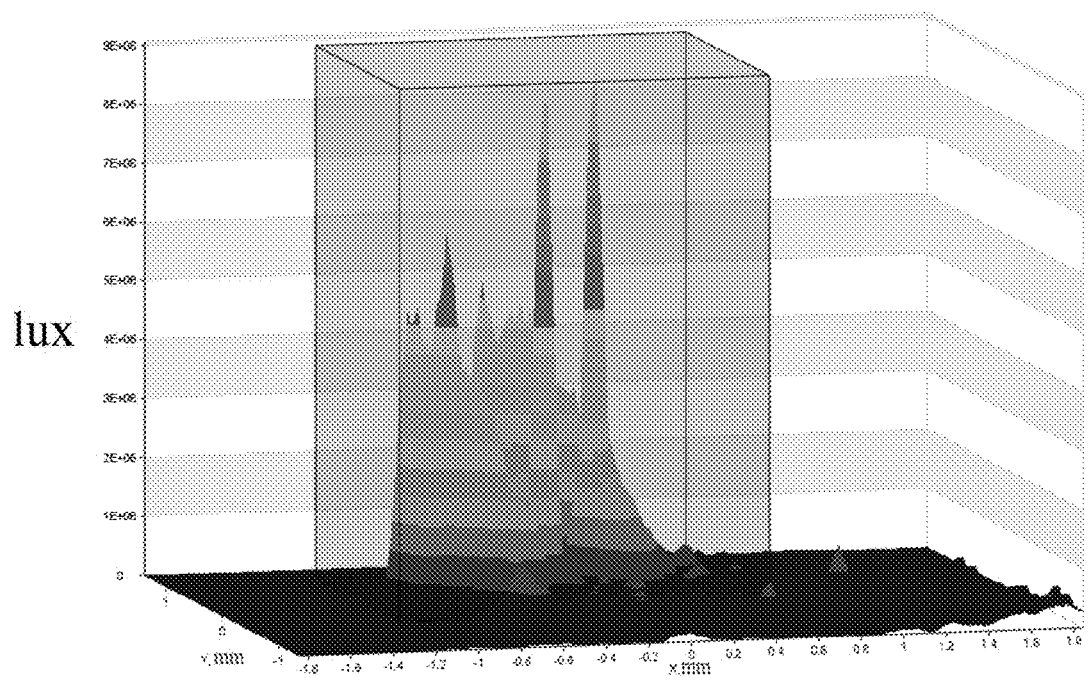
FIG. 13 is a diagram of lux distribution of the lens before processing.
Figure 14:
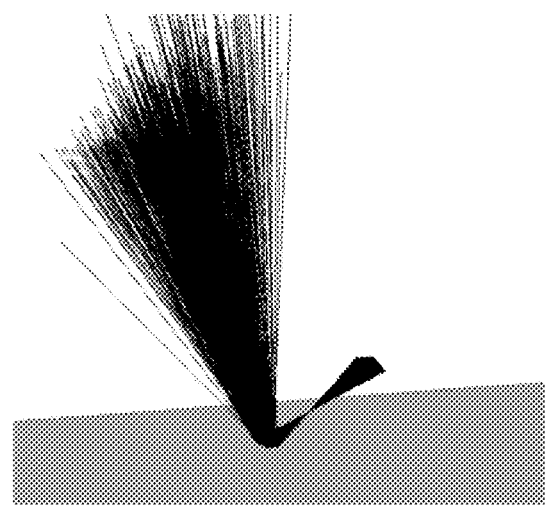
FIG. 14 is a lateral view of light path of the lens which is processed by matting.
Figure 15:
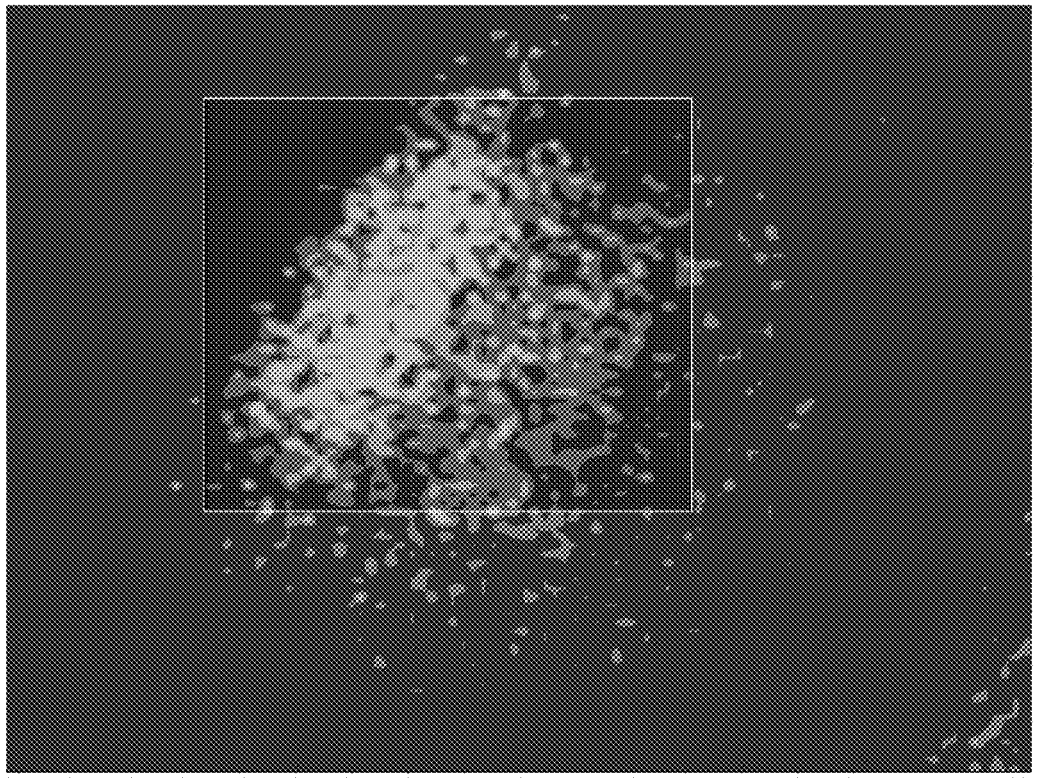
FIGS. 15 and 16 are real photos of light path of the lens which is processed by matting.
Figure 16:
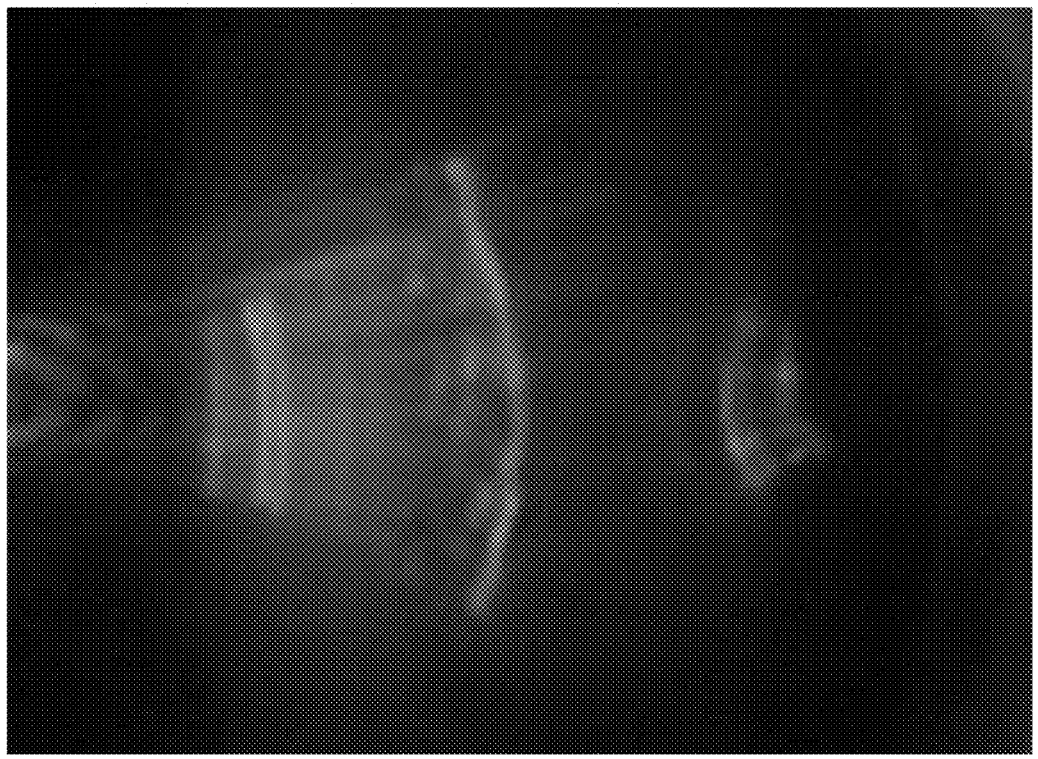
Figure 17:
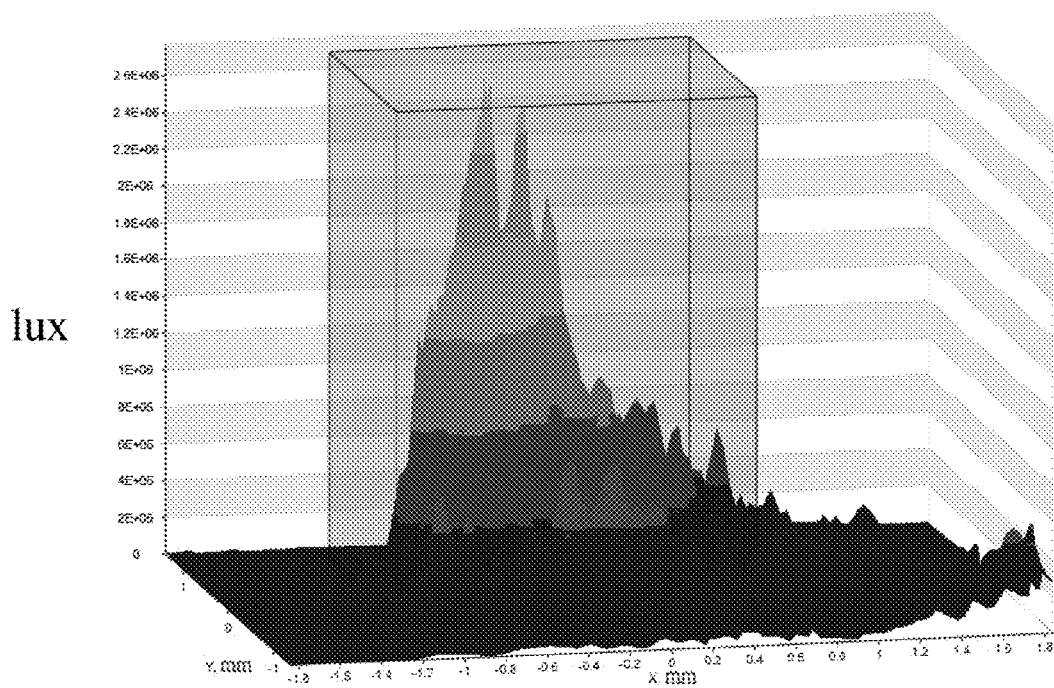
FIG. 17 is a diagram of lux distribution of the lens which is processed by matting.
Figure 18:
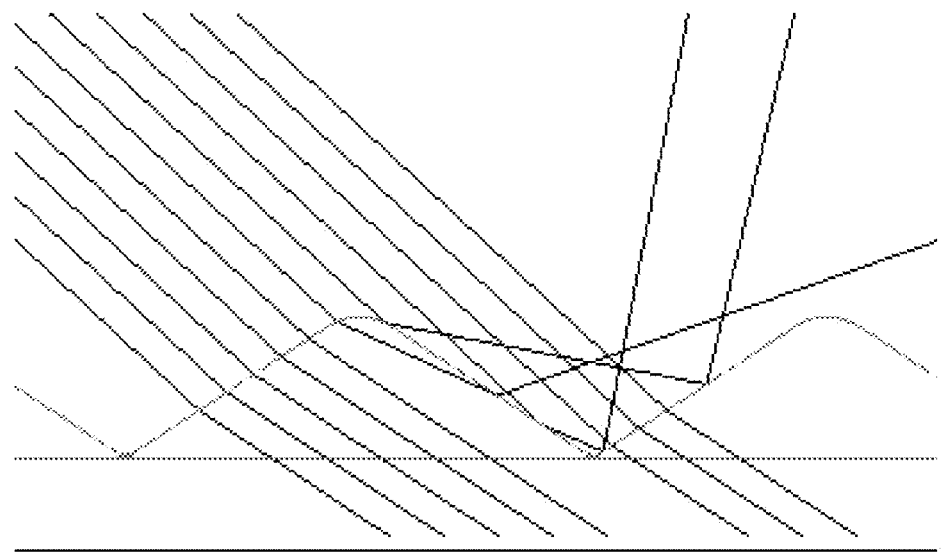
FIG. 18 is a lateral view of light path of the first embodiment of the present invention.
Figure 19:
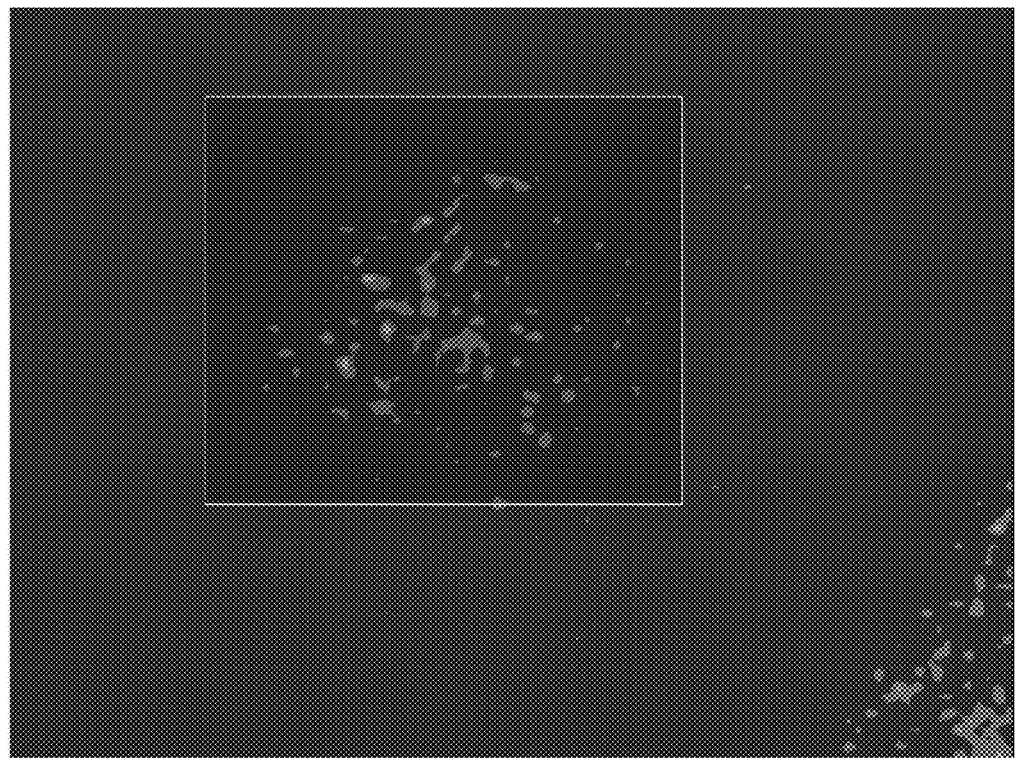
FIG. 19 is a real photo of light path of the first embodiment of the present invention.
Figure 20:
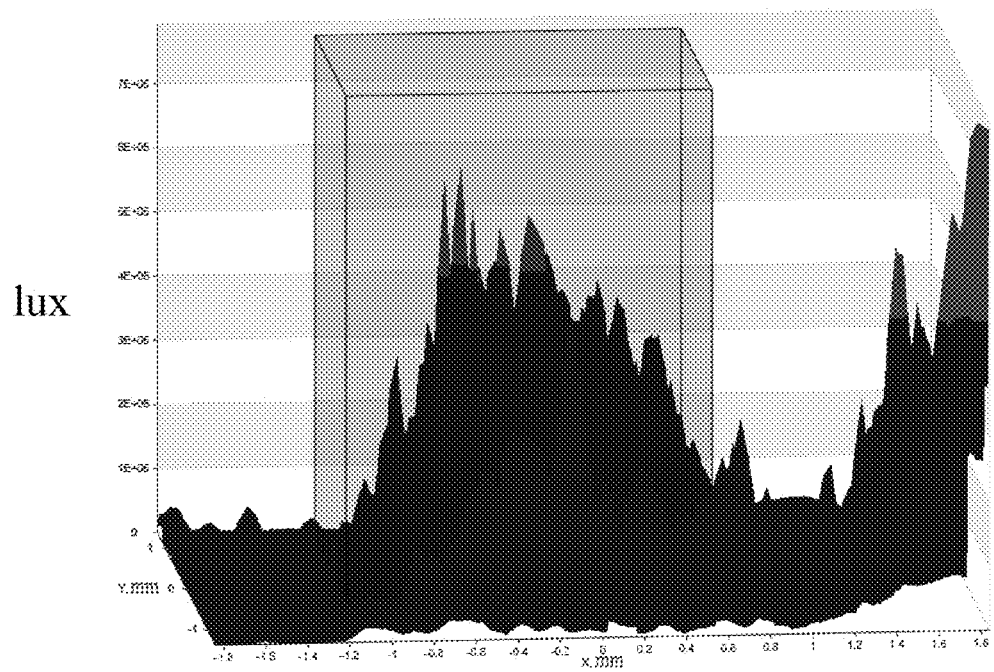
FIG. 20 is a diagram of lux distribution of the first embodiment of the present invention.
Figure 21:
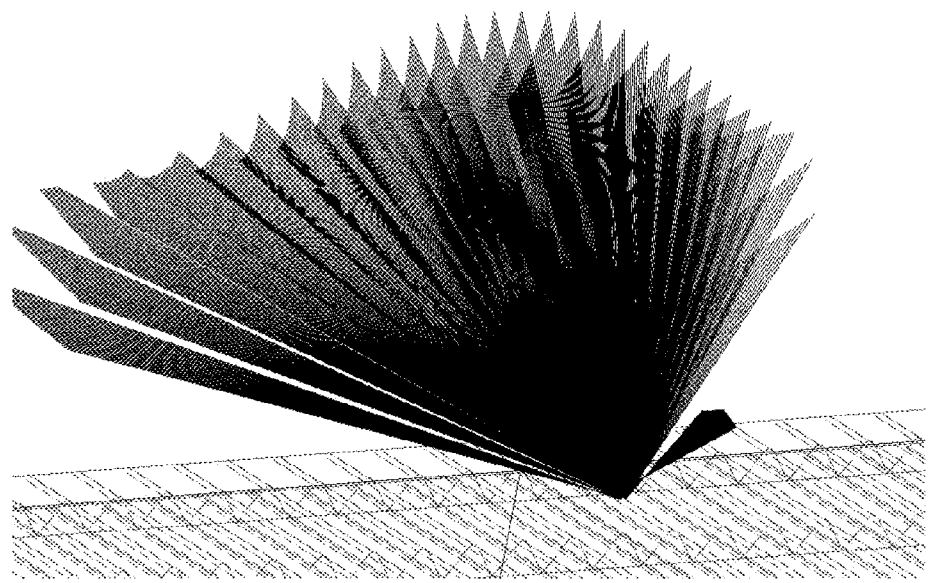
FIG. 21 is a lateral view of light path of the fifth embodiment of the present invention.
Figure 22:
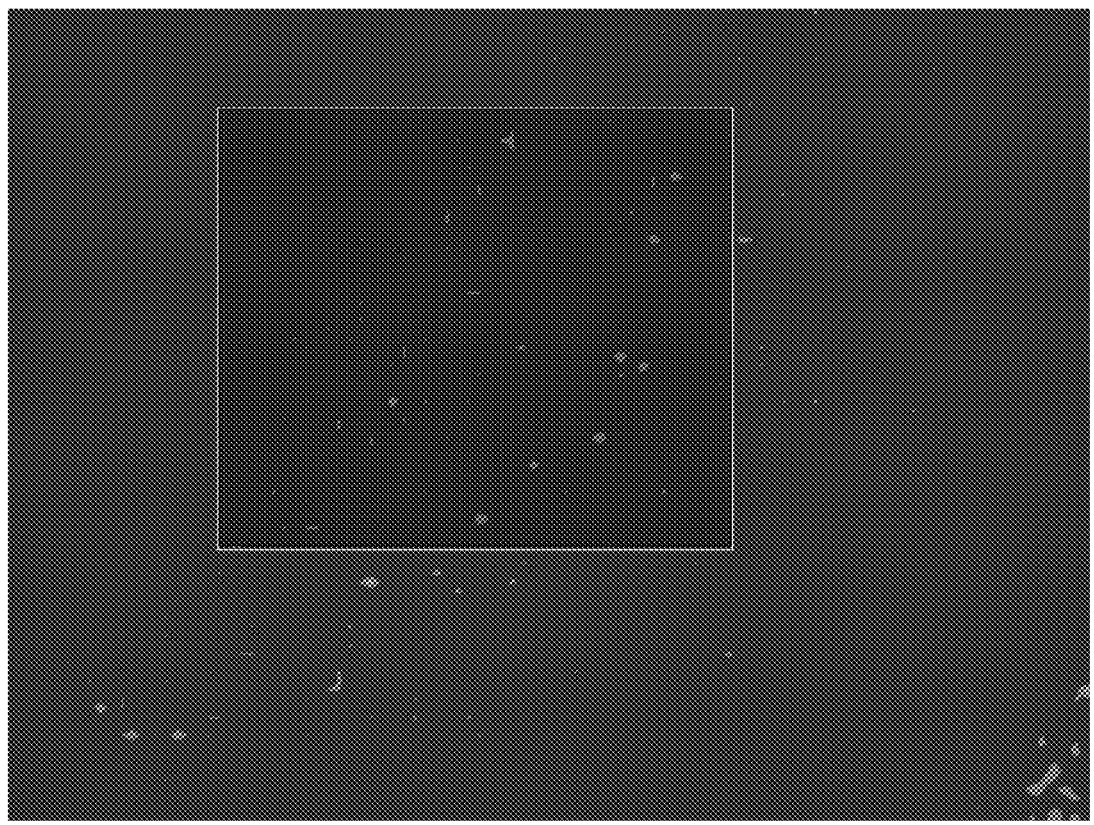
FIG. 22 is a real photo of light path of the fifth embodiment of the present invention.
Figure 23:
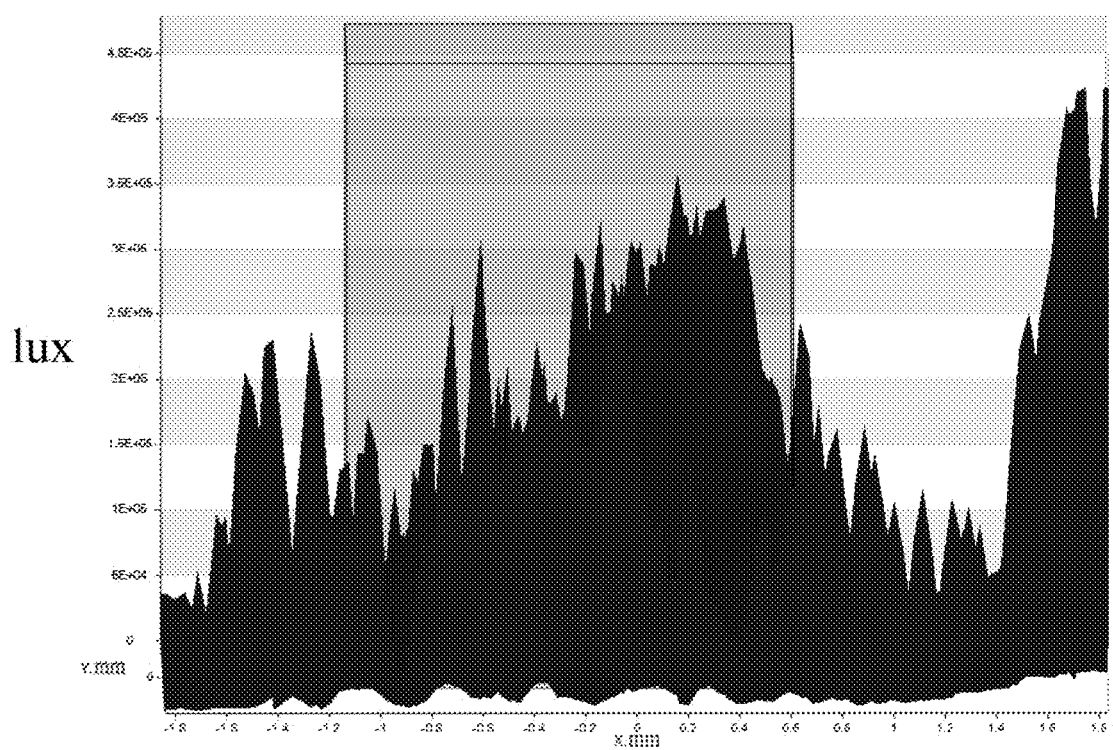
FIG. 23 is a diagram of lux distribution of the fifth embodiment of the present invention.

Please refer to FIGS. 11, 12, and 13, it is obvious that the stray light concentrates to a same direction when the lens lacks of microstructure, and that the performance of imaging is affected. Refer to FIGS. 14, 15, 16, and 17, the stray light slightly disperses when the lens is processed by matting. However, the stray light still concentrates to a substantially same direction. Refer to FIGS. 18-20 and 21-23, it is obvious that the stray light quite disperses.

In conclusion, due to the microstructure of the present invention, the stray light can be dispersed to give a better performance of imaging. Thus the yield rate is improved.

What is claimed is:

1. A lens having microstructures, having a first face and a second face, at least the first face having an optical portion at a central portion thereof, an optical mechanism portion surrounding the optical portion, at least a part of an area of the optical mechanism portion being formed with at least one recessed microstructure, a bottom of the at least one microstructure having a matte surface;

wherein the lens defines a central axis penetrating a center of the lens, the lens has plural the microstructures, each microstructure extends around the central axis, the microstructures are annular grooves arranged concentrically in interval; and wherein each annular groove has a lowest bottom portion, an uppermost top portion is defined between any two adjacent annular grooves, a distance between any two adjacent bottom portions is 0.024 mm to 0.05 mm, a distance along a direction of the central axis between any one top portion and the bottom portion adjacent thereto is 8 micrometers to 12 micrometers, an angle defined by any one bottom portion and the two top portions adjacent thereto is 60 degrees to 80 degrees.

2. The lens having microstructures of claim 1, wherein a cross-section of each annular groove is V-shaped.

3. The lens having microstructures of claim 1, wherein a cross-section of a bottom of each annular groove is semicircular.

4. The lens having microstructures of claim 1, wherein a cross-section of each annular groove is quadrangle.

5. The lens having microstructures of claim 1, wherein the lens defines a central axis penetrating a center of the lens, the lens has plural the microstructures, the microstructures are grooves extending radially and arranged in interval around the central axis.

6. The lens having microstructures of claim 1, wherein the lens defines a central axis penetrating a center of the lens, the microstructure is a spiral groove extending around the central axis.

7. The lens having microstructures of claim 1, wherein the at least one microstructure is formed by laser carving.

\* \* \* \* \*